US006662881B2

(12) United States Patent
Domann

(10) Patent No.: US 6,662,881 B2
(45) Date of Patent: Dec. 16, 2003

(54) WORK ATTACHMENT FOR LOADER VEHICLE HAVING WIRELESS CONTROL OVER WORK ATTACHMENT ACTUATOR

(75) Inventor: Dennis Domann, Valley Falls, KS (US)

(73) Assignee: Sweepster, LLC, Dexter, MI (US)

(*) Notice: Subject to any disclaimer, the term of this patent is extended or adjusted under 35 U.S.C. 154(b) by 19 days.

(21) Appl. No.: 10/173,349

(22) Filed: Jun. 17, 2002

(65) Prior Publication Data

US 2002/0189435 A1 Dec. 19, 2002

Related U.S. Application Data

(60) Provisional application No. 60/299,202, filed on Jun. 19, 2001.

(51) Int. Cl.[7] ............................ E02F 9/22; A01B 51/00
(52) U.S. Cl. ....................................................... 172/272
(58) Field of Search ............................ 172/2, 3, 4, 4.5, 172/5, 7–11, 272, 273, 439; 701/50; 37/348

(56) References Cited

U.S. PATENT DOCUMENTS 2,972,424 A 2/1961 Cadwell
3,043,375 A 7/1962 Astrom
3,220,487 A 11/1965 Pilch
3,324,954 A 6/1967 Westendorf
3,329,225 A 7/1967 Dunn
3,460,690 A 8/1969 Seifert
3,631,762 A 1/1972 Fuzzell
3,703,931 A 11/1972 Page et al.
3,720,047 A 3/1973 van der Lely
3,757,976 A 9/1973 van der Lely
3,771,677 A 11/1973 Pilch
3,811,581 A 5/1974 Van Der Lely
3,833,136 A 9/1974 Spicer et al.
3,863,786 A 2/1975 Frank
3,876,023 A 4/1975 Hushower et al.
3,912,095 A 10/1975 Miller
3,913,641 A 10/1975 White
3,936,960 A 2/1976 Clegg
3,949,889 A 4/1976 Moe
3,964,182 A 6/1976 Pomeret et al.
3,985,394 A 10/1976 Rolfes
3,991,890 A 11/1976 Frank
4,043,470 A 8/1977 Pilch (List continued on next page.)

FOREIGN PATENT DOCUMENTS

EP 0 352 654 A2 1/1990
EP 0 598 937 A1 6/1994
EP 0 810 331 A1 12/1997
JP 403183823 A 8/1991

OTHER PUBLICATIONS

U.S. patent application Ser. No. 09/749,356, Brandt et al., filed Jul. 5, 2001.
U.S. patent application Ser. No. 09/803,827, Saveliev et al., filed Aug. 2, 2001.

(List continued on next page.)

*Primary Examiner*—Robert E. Pezzuto
(74) *Attorney, Agent, or Firm*—Leydig, Voit & Mayer, Ltd.

(57) ABSTRACT

Hydraulic actuators and/or other parameters on a work attachment for a skid steer loader are controlled with a wireless remote control kit. The kit includes a manual input device and transmitter mounted to the skid steer loader and a receiver on the work attachment that communicates with the transmitter. The receiver directly couples the manual input from the vehicle operator to the solenoid valves that control hydraulic flow to the hydraulic actuators on the work attachment, without processing by an electronic controller. The response of hydraulic actuators directly corresponds to the manual input provided by the vehicle's operator. The manual input device, transmitter module and the independent power source may be self-contained in a module that is attachable and detachable to skid steer loader. The module can be removed and transferred along with the attachment such that the attachment is usable with different skid steer loaders.

68 Claims, 7 Drawing Sheets

U.S. PATENT DOCUMENTS

| | | | |
|---|---|---|---|
| 4,050,596 | A | 9/1977 | Zeuner et al. |
| 4,056,250 | A | 11/1977 | Uchiyama |
| 4,087,009 | A | 5/1978 | Profenna et al. |
| 4,095,752 | A | 6/1978 | Pomeret et al. |
| 4,098,344 | A | 7/1978 | Johnson |
| 4,163,627 | A | 8/1979 | Schnittjer et al. |
| 4,177,001 | A | 12/1979 | Blackwood |
| 4,199,033 | A | 4/1980 | Van Gundy, Jr. |
| 4,222,186 | A | 9/1980 | Molby |
| 4,271,879 | A | 6/1981 | Shivers, Jr. et al. |
| 4,345,870 | A | 8/1982 | Anderson et al. |
| 4,381,872 | A | 5/1983 | Hahn |
| 4,403,427 | A | 9/1983 | Dahlquist |
| 4,470,751 | A | 9/1984 | Masuzawa et al. |
| 4,483,084 | A | 11/1984 | Caldwell et al. |
| 4,509,768 | A | 4/1985 | Haug |
| 4,526,413 | A | 7/1985 | Williams |
| 4,620,362 | A | 11/1986 | Reynolds |
| 4,621,375 | A | 11/1986 | Simnovec |
| 4,660,306 | A | 4/1987 | Bruce et al. |
| 4,773,689 | A | 9/1988 | Wolters |
| 4,802,814 | A | 2/1989 | Kourogi et al. |
| 4,822,222 | A | 4/1989 | Zeuner et al. |
| 4,846,283 | A | 7/1989 | Batcheller |
| 4,850,766 | A | 7/1989 | Furuhashi et al. |
| 4,880,346 | A | 11/1989 | Brassette |
| 4,934,463 | A | 6/1990 | Ishida et al. |
| 4,944,649 | A | 7/1990 | Stralow |
| 4,949,805 | A | 8/1990 | Mather et al. |
| 4,957,408 | A | 9/1990 | Ohkura |
| 4,960,359 | A | 10/1990 | Lovitt, Jr. |
| 4,964,779 | A | 10/1990 | Sagaser |
| 4,974,400 | A | 12/1990 | Chubey et al. |
| 5,000,269 | A | 3/1991 | Aoki et al. |
| 5,065,326 | A | 11/1991 | Sahm |
| 5,074,373 | A | 12/1991 | Schmidt |
| 5,081,941 | A | 1/1992 | Weeks |
| 5,092,422 | A | 3/1992 | Hood, Jr. et al. |
| 5,147,173 | A | 9/1992 | Fauber et al. |
| 5,174,115 | A | 12/1992 | Jacobson et al. |
| 5,182,908 | A | 2/1993 | Devier et al. |
| 5,188,502 | A | 2/1993 | Tonsor et al. |
| 5,232,329 | A | 8/1993 | Livingston |
| 5,249,140 | A | 9/1993 | Kessler |
| 5,257,177 | A | 10/1993 | Bach et al. |
| 5,299,857 | A | 4/1994 | Zanetis |
| 5,347,448 | A | 9/1994 | Nam |
| 5,353,851 | A | 10/1994 | Cline |
| 5,398,766 | A | 3/1995 | Nakayama et al. |
| 5,423,654 | A | 6/1995 | Rohrbaugh |
| 5,425,431 | A | 6/1995 | Brandt et al. |
| 5,442,868 | A | 8/1995 | Ahn |
| 5,459,952 | A | 10/1995 | Tillaart et al. |
| 5,479,729 | A | 1/1996 | Eslambolchi |
| 5,495,987 | A | 3/1996 | Slaby |
| 5,509,369 | A | 4/1996 | Ford et al. |
| 5,590,731 | A | 1/1997 | Jacobson |
| 5,590,998 | A | 1/1997 | Wilcox |
| 5,600,904 | A | 2/1997 | Bowling |
| 5,607,277 | A | 3/1997 | Zopf |
| 5,618,155 | A | 4/1997 | Tighe |
| 5,638,619 | A | 6/1997 | Bowling |
| 5,692,735 | A | 12/1997 | Aho et al. |
| 5,713,419 | A | 2/1998 | Kaczmarski et al. |
| 5,842,684 | A | 12/1998 | Aho |
| 5,894,688 | A | 4/1999 | Struck et al. |
| 5,957,213 | A | 9/1999 | Loraas et al. |
| 6,082,630 | A | 7/2000 | Bohrer |
| 6,112,139 | A | 8/2000 | Schubert et al. |
| 6,199,629 | B1 | 3/2001 | Shirk et al. |
| 6,202,014 | B1 | 3/2001 | Brandt et al. |
| 6,216,918 | B1 | 4/2001 | Saveliev et al. |
| 6,263,519 | B1 | 7/2001 | Parsons et al. |
| 6,269,875 | B1 | 8/2001 | Harrison, III et al. |

OTHER PUBLICATIONS

Stone Construction Equipment, Inc., Press Release for *Snap–Tek System Provides Plug–In Simplicity and Versatility, Stone Bulldog Snap–Tek System*, Feb., 2002, 2 pages.

Stone Construction Equipment, Inc., Press Release for *Snap–Tek Bulldog Remote Offers Safety in the Trenches*, Feb., 2000, 3 pages.

Ingersoll–Rand Company, News Release for *Next Generation in Trench Compactors*, 1 Page—No date.

Wacker Corporation, News Release for *Wacker's Remote Control System Offers Ultimate in Convenience and Versatility*, Aug., 1999, 1 page.

Wacker Corporation, *Wacker Compaction Products*, 1 page—No date.

Blaw–Knox, *User–Friendly AGS–7 Grade/Slope Controller for Blaw–Knox Blaw–Kontrol II*, Dec., 1998, 2 pages.

Ingersoll–Rand Company, *TC–13 Trench Compactor*, 2000, 2 pages.

Bomag, *Bomag Displays BMP851 Multi–Purpose Compactor at ARA '00*, Feb. 14, 2000, 3 pages.

*Asphalt Zipper*, Apr. 8, 2002, 2 pages.

B. Foster & Company, *14' Hydraulic Dump Trailers*, Apr. 9, 2002, 2 pages.

Stone Construction Equipment, Inc., *Everything You Want in One Tough Worker*, 2000, 3 pages.

*Bobcat Attachments for Loaders*, 5 pages—No date.

Boblag Company, *Attachment Control Kit*, Apr. 9, 2002, 2 pages.

Visitect Incorporated, *RF304RM Miniature Transmitters and Receivers*, 2 pages—No date.

Visitect Incorporated, *RF304XT Miniature Transmitters and Receivers*, 2 pages—No date.

WORK ATTACHMENT FOR LOADER VEHICLE HAVING WIRELESS CONTROL OVER WORK ATTACHMENT ACTUATOR

CROSS-REFERENCE TO RELATED PATENT APPLICATIONS

This patent application claims the benefit of U.S. provisional patent application No. 60/299,202, filed Jun. 19, 2001, the entire disclosure of which is hereby incorporated by reference in its entirety.

FIELD OF THE INVENTION

The present invention relates generally to commercial work vehicles such as skid steer loaders and attachments therefore, and more particularly relates to the operation and/or hydraulic control of attachments attached to commercial work vehicles such as skid steer loaders.

BACKGROUND OF THE INVENTION

Skid steers, loader tractors and other commercial work vehicles are commonly used for many industrial, agricultural, and landscaping operations. These work vehicles typically have two laterally spaced loader arms that extend in front of the vehicle that are adapted to attach to a wide variety of attachments. A number of attachments can be selectively attached and detached from the loader arms or the three point hitch to make these work vehicles applicable to a wide variety of applications. For example, a bucket is commonly provided to dig, dump, and transport loose materials such as dirt, sand, and gravel. The loader arms are hydraulically driven to raise and lower the attachment and pivot the attachment in a horizontal axis.

Skid steer loaders and other work vehicles commonly have a single hydraulic hook-up, which is typically comprised of a pair of quick connect hydraulic couplings (one for pressurized hydraulic flow and the other for low pressure return flow) that can be utilized by the attachment for any desired purpose. A control valve is provided in the operator cab for controlling the hydraulic flow to the attachment through the hydraulic couplings. The control valve may be a manually operated rocker lever valve which is common in older skid steer loaders (or less complex or less expensive current models) or an electronically operated control valve that is activated with an electronic trigger integrated into the control levers used to mobilize the vehicle in certain complex or modern skid steer loaders.

One common use of the hydraulic output includes positioning the attachment tool (e.g. shifting the tool left or right about a vertical axis to effect a windrow and/or to direct dirt, gravel or debris, or raising and lowering or tilting the tool). The hydraulic output may also be used for hydraulically driving an engaging device such as the rotary rake of a rock raking attachment, a rotary blower of a snowblower, a rotary planner of a cold planner, or other rotary tool. More complex attachments include two or more hydraulic functions or actuators. For example, rotary broom attachments, snowblower attachments, backhoes, cold planners are some of the attachments that often have two or more hydraulic functions or actuators.

Although a single hydraulic hook up from the skid steer loader is sufficient for many applications, it is often insufficient for certain attachments where it is required, or desirable, to have hydraulic control over more than one function, such as rotary broom attachments. For example, rotary broom attachments often include: (1) a hydraulic cylinder for tilting the broom left or right about a vertical axis to direct swept debris or effect a windrow and (2) a hydraulically driven motor that rotates the broom to sweep material. Each of these two functions, however, must be supplied with hydraulic power from the single hydraulic hook up.

The common approach for controlling two separate hydraulic functions with a single power source has been to use an electronically operated solenoid on the attachment downstream of the single hydraulic hook up. These solenoid valves switch the hydraulic power between the two functions. As is expressly recognized in U.S. Pat. No. 6,354,081, this can have significant drawbacks. One drawback is that electrical wiring harnesses, electrical hook-ups and electrical couplings from the skid steer loader are necessary to power and control solenoid valves. These electrical components increase the time and difficulty of attaching and detaching attachments. Loose wires can also break or sever when not properly secured or when not properly located out of the way when not in use. Due to the environment in which work attachments operate, these electrical components are also often subject to wear, poor and increased resistance connections, bent connector pins, short circuits and the like. In view of the foregoing, electrical hook-ups, wiring and couplings have lead to much aggravation for work vehicle operators, require frequent replacement, and are not desirable.

A further complexity existing in the art is that loader vehicles are made by several different manufacturers that may or may not have integrated control systems wired into the electronics of the loader vehicle. Integrated control systems among different manufacturers may also have different protocols or operational standards/configurations. As noted above, some modern and complex machines have integrated triggers in the control levers that have traditionally operated the wheels of the loader vehicle. Older or less complex loader vehicles or less expensive modern loader vehicles are more simplistic and do not have integrated controls, but bare handle levers in the cab of the loader vehicle. Further, conforming the attachment control design to the available controls from a skid steer loader has severely limited the design of such attachments. That is, while the attachment manufacturer could implement advanced control features, the limitation of the type of control interface provided by the loader vehicle has prevented many of these advanced features from being released. Some attachments may be designed to be compatible with only one or a limited number of loader vehicles because of such interface constraints.

In view of the foregoing, it is difficult to make an attachment that can be universally used with the different loader machines that exist in the commercial market. This has provided a barrier to technological innovations in the marketplace. If a work attachment were to have a specially configured control system that is set up for electrical communication with one commercial make and brand of a skid steer loader machine, the attachment would be incompatible or difficult to use with other types of skid steer machines, such as those providing insufficient controls to operate the work attachment. This has several disadvantages. For example, specialized work attachment control systems can make it difficult for distributors and retail companies to stock attachments for customers who own different makes, models and brands of skid steer loaders. This also makes it difficult for work attachment rental companies to stock work attachments for different customers who may have different brands, makes and models of skid steer loader machines.

Lastly, this can also reduce the resale value of the work attachment for a customer as it may make the work attachment more unique and therefore more difficult to find a buyer, thus providing a disincentive for purchasing the work attachment in the first place.

BRIEF SUMMARY OF THE INVENTION

In light of the above, it is a general aim of the present invention to eliminate the need for electrical wiring hook ups, electrical couplings, and electrical wiring on attachments for work vehicles that have more than one operational parameter or hydraulic function.

In that regard, it is a further objective of the present invention to provide a work attachment that is substantially universal and can be used among different brands, makes and models of machinery without concern about whether sufficient controls on the skid steer loader exist for operating the work attachment.

In accordance with these and other objectives, the present invention is directed towards a wireless remotely controlled work attachment for a skid steer loader vehicle or other similar commercial loader vehicle. Wireless communication is achieved through a manual input device and transmitter, which may be mounted on the loader vehicle and a receiver on the work attachment that receives wireless transmissions from the transmitter.

According to one aspect of the present invention, the manual input device and transmitter module is independently powered and not connected to the electrical system of the skid steer vehicle. In this regard, it is a further aspect that the manual input device, transmitter module and the independent power source may be self-contained in a housing that is attachable and detachable to skid steer loader. The module can thus be removed and transferred along with the attachment such that the work attachment is universal and can be used with different makes and models of skid steer loaders, regardless of the available features and control interface provided by the skid steer loader.

According to different aspect of the present invention, the wireless receiver directly couples the manual input of the vehicle's operator to the solenoid valves or other electrical switches that control hydraulic flow or other parameters on the work attachment, without any processing by an electronic controller. This provides for hydraulic actuator/parameter response that directly corresponds to the manual input provided by the vehicle's operator.

It is a feature that the present invention may be incorporated into a kit and used to replace worn out wires on existing attachments, or incorporated into a new work attachment as an alternative to control wire harnesses. The provision of a kit provides for easy and inexpensive incorporation of the present invention into a work attachment. To further enhance the universal applicability of the kit, the wireless receiver includes a feature that allows the output control channels to be selectable between latching and momentary control outputs.

It is another feature of the present invention that the work attachment may include a battery and battery recharger to provide an independent and rechargeable power supply on the work attachment.

It is another feature of the present invention that the manual input and transmitter device may removably mount directly to the control levers in the cab of a skid steer loader vehicle that operate the wheels of the vehicle. According to one embodiment, a dial is provided to switch between channels that operate different hydraulic actuators or other parameters on the work attachment, and a trigger to generate control signals along the dialed channel. The dial may be operated with one finger such as a thumb, while the trigger may be operated with a different finger such as an index finger. This allows a vehicle operator to control parameters on the skid steer while at the same time controlling different parameters on the work attachment.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
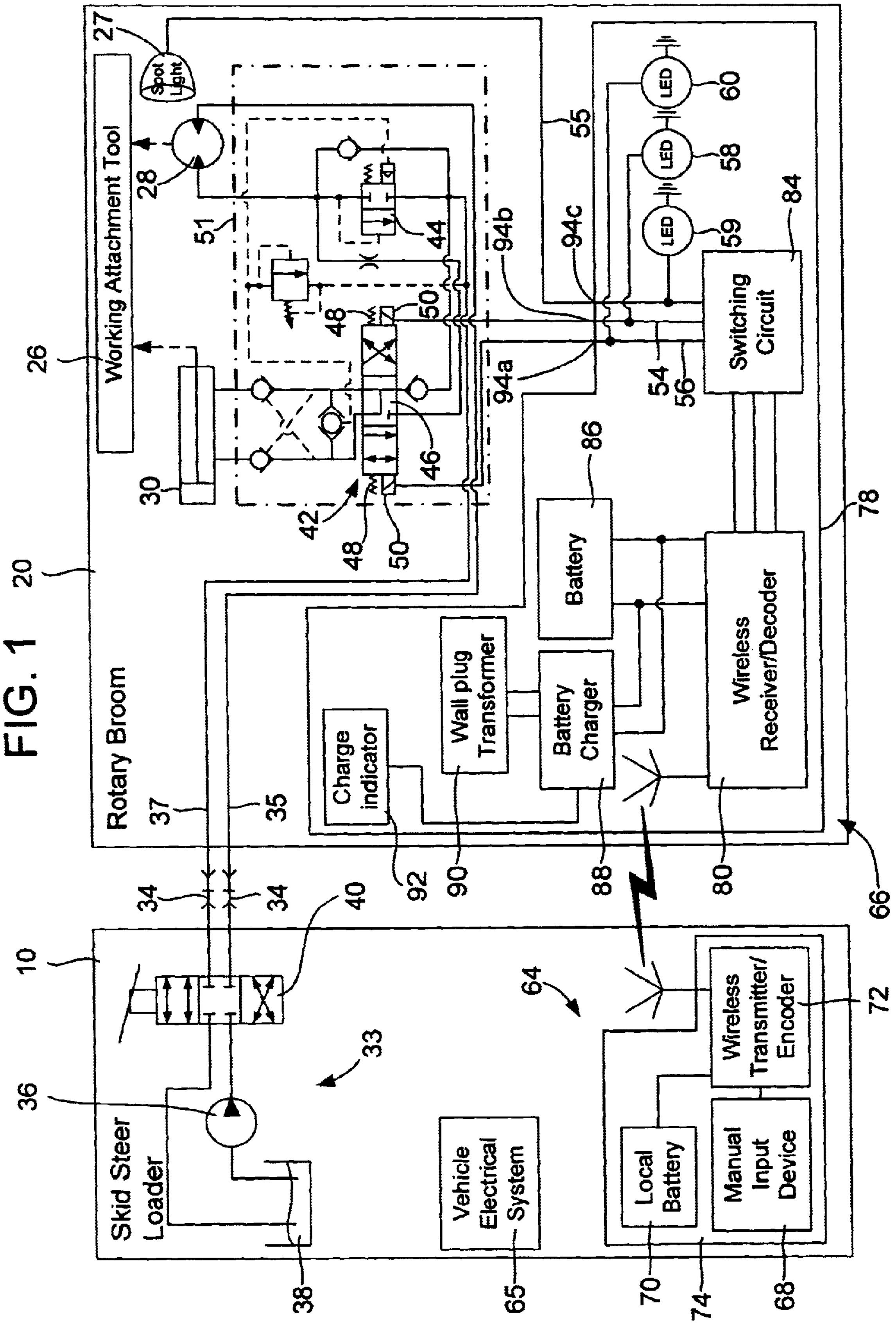
FIG. 1 is a schematic view of work apparatus having a wireless remote control kit installed on a rotary broom attachment and a skid steer loader vehicle according to a first embodiment of the present invention.
Figure 2:
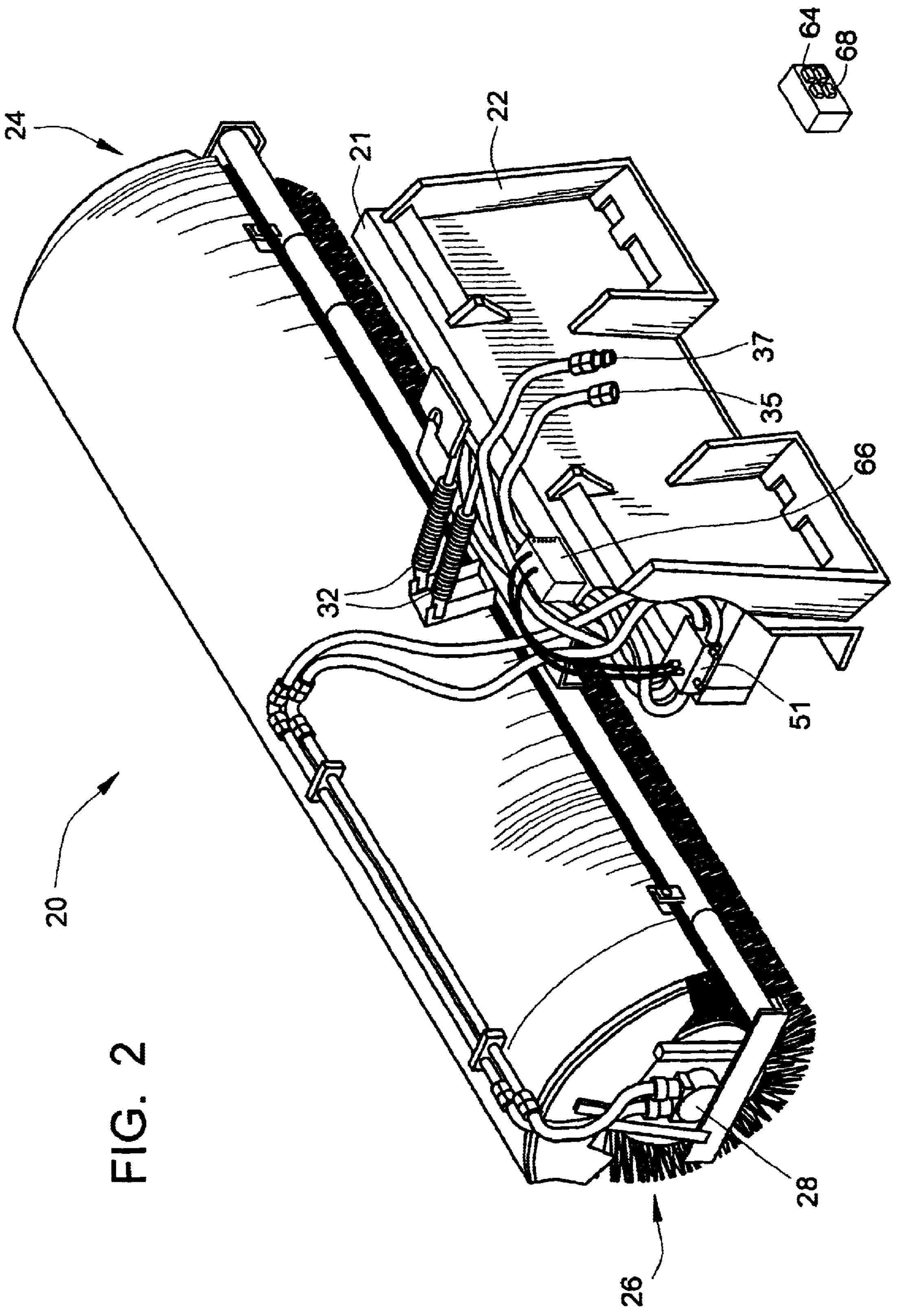
FIG. 2. is an isometric view of a work attachment having the wireless remote control kit installed thereon and a mountable transmitter module for use therewith as schematically indicated in FIG. 1.
Figure 3:
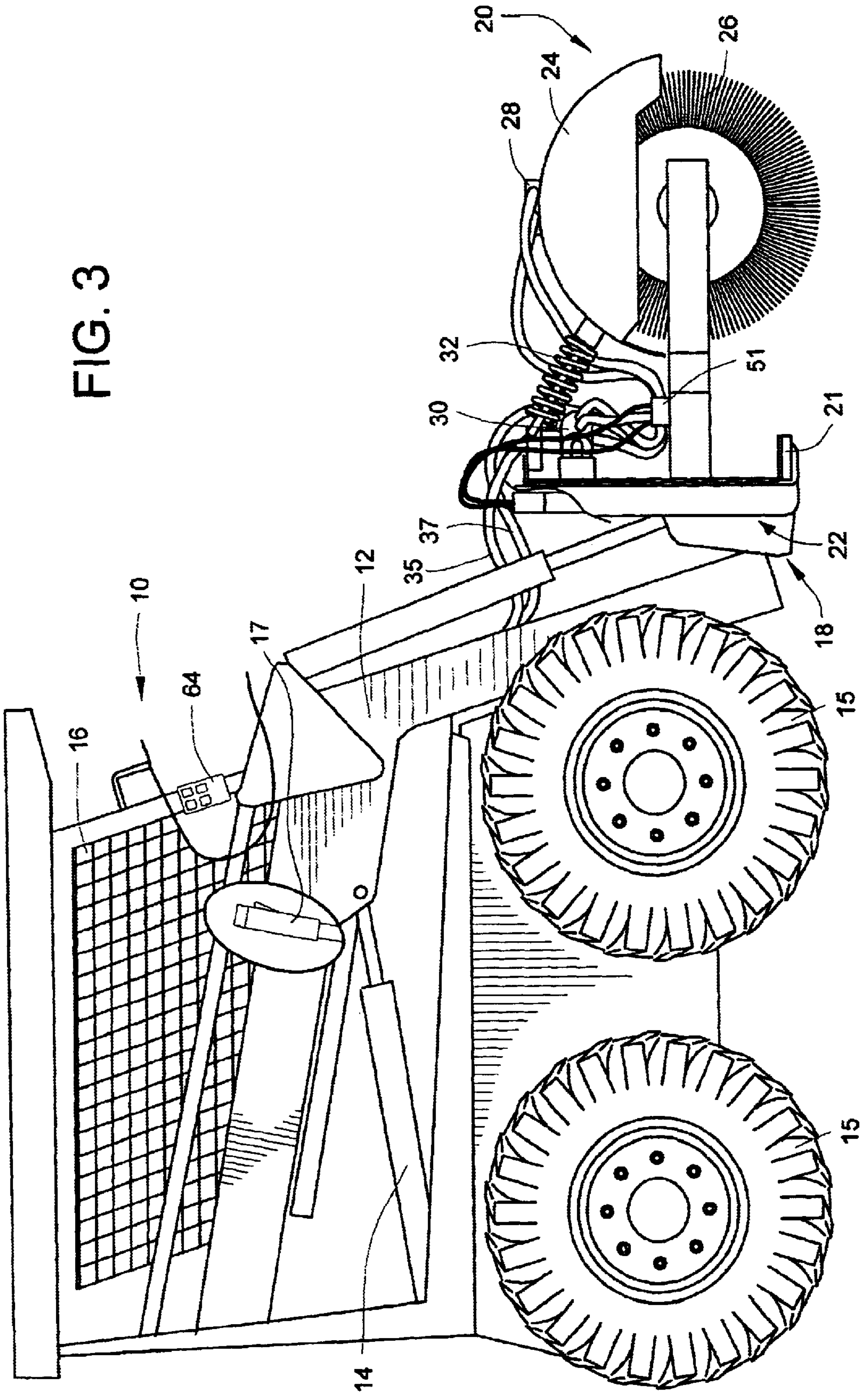
FIG. 3 is a side elevation view of the work vehicle apparatus shown in FIG. 2.

Referring to the drawings and specifically to FIGS. 1–3, it can be seen that the present invention generally relates to the field of commercial work vehicles such as a skid steer loader 10 as shown, or other loader tractors, tractors and similar commercial work vehicles. A skid steer loader 10 is adapted for use in many industrial, agricultural and landscaping applications wherein easy maneuverability, power lifting and transporting capabilities are desired. The skid steer loader 10 is provided with a pair of laterally spaced loader arms 12 that are driven along an arcuate path by hydraulic cylinders 14. The loader arms 12 are pivotally mounted to the main body of the skid steer loader 10 on each side of the operator cab 16. The skid steer loader 10 is mobilized forwardly and rearwardly through two control levers 17, one on each side of the operator's seat. The control levers 17 control the hydraulic flow that operate the wheels 15 on opposite sides of the skid steer loader 10. When each control lever 17 is manually pushed forward, its corresponding wheel 15 turns to move the loader vehicle forward. When control lever 17 is manually pushed rearward, its corresponding wheel 15 turns in a reverse direction to move the loader vehicle rearward. Through operation of the control levers 17, the vehicle can be selectively manipulated to move forward, rearward, turn, and spin about as may be desired.

Toward the front end of the loader arms 12 there is provided a mounting structure which takes the form in this embodiment as a quick attach plate 18 as is well known in the art. The quick attach plate 18 allows for selective attachment and detachment of the skid steer loader 10 to a wide variety of attachments for industrial, agricultural, construction, landscaping, commercial and other applications.

For purposes of illustration to demonstrate one of the many different applications of the present invention, the attachment is shown in the form of a rotary broom attachment 20 as shown in FIGS. 1–3. However, it will be understood that the invention is applicable to any one of a variety of attachments such as but not limited to a backhoe, a rotary broom, a snow blower, a tree spade, grapples, or other such similar implements. One common element of each of the attachments to which the present invention pertains is that these attachments have multiple controlled parameters such as fluid powered actuators (typically either hydraulic cylinders or hydraulic rotary motors, although the invention may also be applicable to local pneumatic power systems and electrical motors/devices as well).

The rotary broom attachment 20 includes a mounting support structure 21 (including a quick attach plate 22), a broom support frame 24, and a rotary broom 26. The quick attach plate 22 is adapted to be quickly attached and detached from the quick attach plate 18 of the skid steer loader 10 in a well-known conventional manner. The rotary broom 26 is mounted for rotation to the broom support frame 24 in a conventional manner. A first hydraulic actuator, namely a hydraulic rotary motor 28, is mounted to an end of the broom support frame 24 and drives the rotary broom 26 about its axis of rotation to provide for sweeping of dirt, debris, gravel and other material. The broom support frame 24 is pivotably mounted about a vertical axis to the mounting support structure that supports the quick attach plate 22 such that the rotary broom 26 may be pivoted left or right to direct dirt, debris, gravel and other material being swept by the rotary broom 26. To control the tilt position of the broom 26, a second hydraulic actuator shown in the form of a hydraulic cylinder 30 is mounted between the support structure 21 and the broom support frame 24 such that expansion and contraction of the hydraulic cylinder 30 pivots the broom to the desired angle. A pair of stabilizer spring supports 32 is also connected between the support structure 21 and the broom support frame 24.

Referring to FIGS. 1 and 2, the disclosed embodiment includes two different hydraulic functions, including a tilt function and a broom rotation function. With this being said, only one hydraulic working output is typically available from the hydraulic system 33 of the skid steer loader 10, through a pair of quick-connect hydraulic couplings 34 from the hydraulic system 33. During operation, one of the hydraulic couplings 34 carries high pressure hydraulic fluid from the skid steer's hydraulic pump 36 while the other hydraulic coupling vents the return flow of low pressure hydraulic fluid to the skid steer's hydraulic sump 38. The hydraulic couplings 34 attach to hydraulic hoses or lines 35, 37 of the work attachment 20. A manual control (which may be electronically triggered or a manually operated lever) is provided in the operator cab 16 (FIG. 3) to provide control over a four-way, three position, blocked center, control valve 40 (although in some cases, this may be an on/off valve). In the disclosed embodiment, the skid steer's control valve 40 has three possible positions shown schematically in FIG. 1 including a first position shown in which hydraulic flow is directed in one direction through hydraulic lines 35, 37, a second position in which hydraulic flow is reversed in the hydraulic lines 35, 37, and a third position that prevents hydraulic flow to the rotary broom attachment 20 altogether.

A solenoid valve 42 is provided to control hydraulic flow to the hydraulic cylinder 30. In this embodiment, the solenoid valve 42 is shown as a three position valve 46 with two springs 48 and two solenoids 50. The springs 48 are arranged to bias the valve 46 to the center position as shown schematically in FIG. 1. As shown the solenoid valve 42 may be centralized in a single hydraulic control block 51 along with other valves/plumbing and input/output ports to receive, distribute, and return hydraulic power transmitted and returned through hydraulic input hoses or lines 35, 37.

For the hydraulic motor 28, a hydraulically responsive valve 44 is normally open when hydraulic power is provided. The hydraulic motor 28 can be shut off via the operator control valve 40 that is provided in the skid steer loader 10. Alternatively, an on/off solenoid valve (having a single spring and solenoid) may be connected in series with the hydraulic motor 28 to selectively turn on and off the broom attachment electronically utilizing a channel. For the hydraulic cylinder 30, the solenoid valve 42 is centered to hold the angular position of the broom 20. As such, the spring 48 biases the solenoid valve 42 to the center position. The hydraulic cylinder 30 can be driven in either direction by selectively actuating the solenoids 50.

By using the springs 48 to bias the solenoid valve 42 center operating position (e.g. the normal operating position), electrical power necessary to control the work attachment 20 through the solenoids 50 is minimized. This is important because the power used to activate the solenoids 50 is provided by a local power source on the work attachment 20 thereby avoiding electrical power wires between the work attachment 20 and the skid steer loader 10 in a preferred embodiment. As shown schematically in FIG. 1, two electrical lines 54, 56 are provided to provide separate control over the two solenoids 50 of the solenoid valve 42. Each electrical line 54, 56 may be connected to a different solenoid valve (e.g. to different on-off valves), to different solenoids 50 for the same valve 42 as is shown in FIG. 1, or alternatively to multiple solenoid valves to allow for activation of different hydraulic functions or other work attachment parameters simultaneously. In any event, each electrical line 54, 56 represents a different operational channel for controlling hydraulic functions or other parameters independently. The electrical lines or channels may also be used with non-hydraulic functions. For example, a third electrical line 55 is illustrated for operating an electrical spotlight 27. Although multiple channels or electrical lines 54, 55, 56 or channels are shown in the embodiment of FIGS. 1–3, it will be appreciated that more or less electrical lines or channels may be used to provide for the desired control over the number of different hydraulic functions or other parameters that are provided on a work attachment.

In accordance with the present invention, the work apparatus of the first embodiment includes a wireless remote control kit 62 installed thereon. Referring to FIGS. 1–3, and 6 the kit 62 includes a transmitter module 64 mounted to or otherwise provided in the skid steer loader 10, a receiver module 66 mounted to the work attachment 20 and the dedicated electrical wires or lines 54, 55, 56 for connecting the receiver module to differently controlled parameters on the work attachment. The transmitter module 64 may be independent or separate of the electrical power and control system 65 of the skid steer loader 10. The transmitter module 64 includes an operator input device 68, a local power supply shown in the form of a battery 70, an encoder/transmitter 72, a housing 74, and a releasable clamp or mounting structure 76 on the housing 74 that can be mounted to the skid steer loader vehicle 10. The receiver module 66 comprises a housing 78, a receiver/decoder 80, a switching circuit 84, a local power supply shown in the form of a battery 86, a battery charger 88, a wall plug transformer 90 and a battery charge indicator 92 for providing a visual indication of the electrical charge remaining in the battery 86. The receiver module 66 has multiple electrical outlets or terminals 94*a–d* (FIG. 4) corresponding to the various channels of the wireless remote control system. The encoder/transmitter 72 is adapted to encode wireless transmissions in different channels based on the different manual input received at the operator input device 68. The receiver/decoder 80 is adapted to receive encoded wireless transmissions and decode the transmissions for output in the respective channels.

Figure 4:
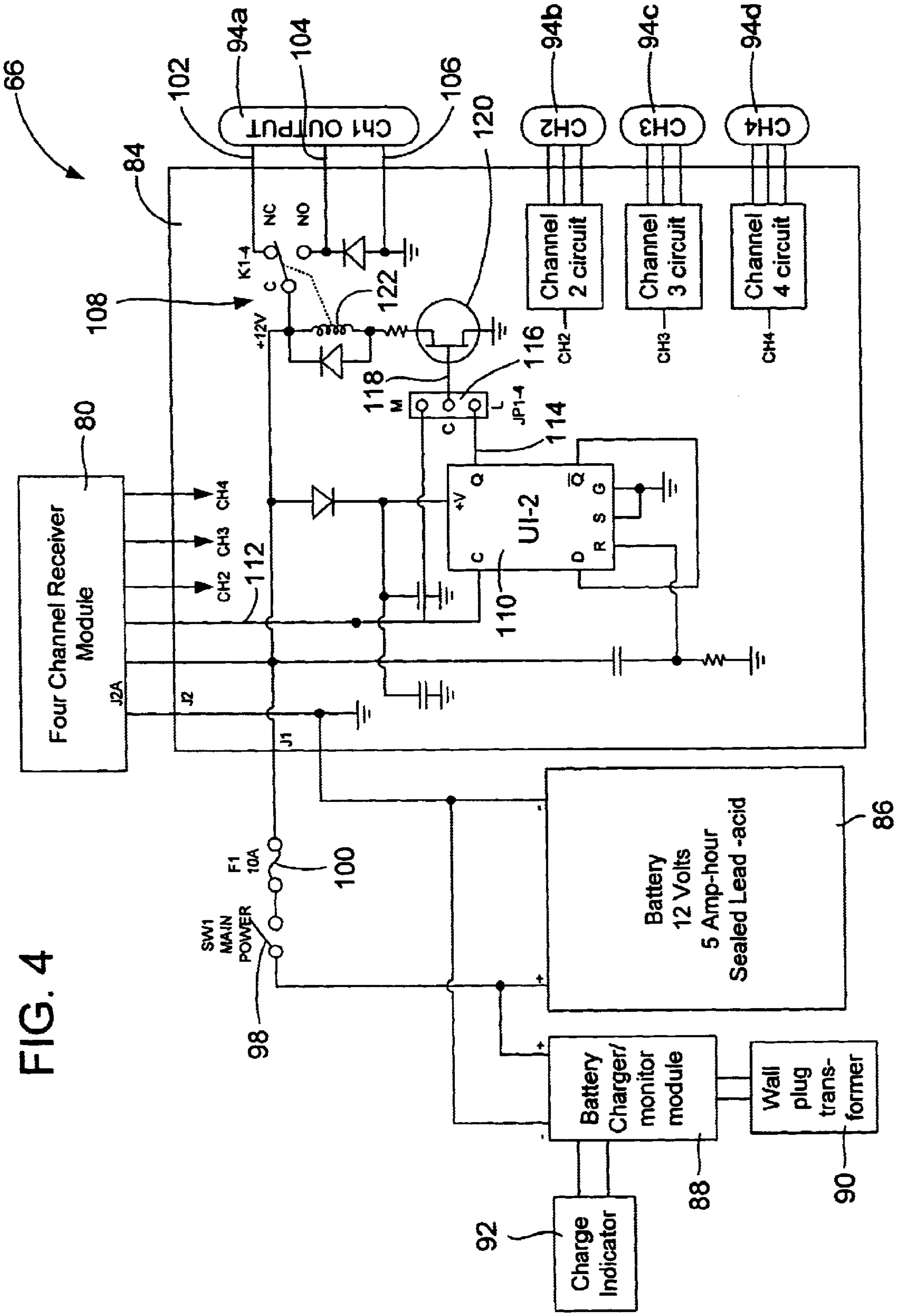
FIG. 4 is a schematic electrical diagram of the switching circuit of the wireless remote control kit shown in FIG. 1.

One embodiment of the receiver module 66 constructed in accordance with the teachings of the present invention is illustrated in simplified schematic form in FIG. 4 to which reference is now made. As illustrated in this FIG. 4, the battery 86 is coupled through a main power switch 98 and protective fuse 100 to the switching circuit 84. The battery charger/monitor module 88 is also coupled to the battery 86 upstream of the main power switch 98 so that the battery 86 may be charged while the receiver module 66 is turned off. In one embodiment of the present invention, the battery charger/monitor module 88 is supplied with electric power from a wall plug transformer 90, although one skilled in the art will recognize that such wall plug transformer 90 may not be required if the battery charger/monitor module 88 includes an input transformer. The battery monitor portion of the module 88 also provides an output to the charge indicators 92 that provide a visual indication of the electrical charge status of the battery 86.

The switching circuit 84 is also coupled to the receiver/decoder module 80, which in this embodiment is illustrated as a four-channel receiver module such as that provided by Visitect under Part No. RF304RM. The switching circuitry for each output channel 94*a–d* is identical, and therefore the following description will describe only a single channel in the interest of brevity. However, one skilled in the art will recognize that the following description is equally applicable to the switching circuitry for each output channel, regardless of how many channels are provided in a particular embodiment.

From a functional standpoint, the switching circuit 84 of the present invention is capable of providing various configurable outputs at each channel depending on the requirements of the controlled equipment to be coupled thereto. That is, each channel's output connector 94 contains three pins to which the controlled equipment may be coupled. One pin 102 provides a normally energized output through the normally closed contact of control switch 108. The control of this switch 108 will be discussed more fully below. A second pin 104 provides a normally de-energized output via the normally open contact of switch 108. The third pin 106 for each channel's output connector 94 provides the ground coupling. In addition to the provision of a normally energized and normally de-energized output connection at each channel, the switching circuitry for each channel also provides the ability of providing a latched or momentary output.

To enable such functionality, a latching logic circuit such as the DQ Flip Flop 110 may be used. Specifically, when the receiver module 80 receives a control input for a particular channel, it generates an output on the appropriate channel control line 112. This channel control line 112 is coupled to the clock input of the DQ Flip Flop 110. The output Q 114 of the DQ Flip Flop 110 is then coupled to jumper terminal block 116. The channel control line 112 is also directly coupled to the jumper terminal block 116. The jumper terminal block 116 also has an output pin 118 that is coupled to the control terminal of an electronic switch, for example, transistor 120. When this pin 118 is energized, transistor 120 begins to conduct current therethrough. This energizes solenoid 122 to transition the control switch 108 from its normally closed to its normally open output configuration. When output pin 118 is not energized, the transistor 120 is turned off, and the control switch 108 returns to its quiescent state.

Whether the control switch 108 is latched in its energized state or merely transitioned momentarily so long as the operator continues to transmit the control signal for this particular channel is dependant on the placement of a jumper on jumper terminal 116. That is, if a jumper is placed between the output pin 118 and the input pin coupled to the output Q 114, operation of transistor 120, energization of solenoid 122, and therefore operation of switch 118 will be latching. However, if a jumper pin is placed between the output pin 118 of terminal 116 and the input connected to the channel control line 112, then the transistor 120 and solenoid 122 will be energized so long as the receiver module 80 continues to receive the command input for that particular channel. Once the receiver module 80 no longer receives the control signal for this channel, it will de-energize the output control line 112 which will, through the jumper on jumper terminal 116 result in the transistor 120 being de-energized. This will stop the flow of current through solenoid 122 and will allow the control switch 108 to return to its quiescent position.

As such, the output coupling 94 is not only selectable between a normally energized or normally de-energized configuration, but may also be configured to provide a latching control output or a momentary control output as discussed above. In the former configuration, the user need only briefly energize the transmitter for this particular channel to result in a latched output change, for example, to turn on the control equipment coupled thereto. When the user wishes to turn off the controlled equipment, he need only briefly retransmit a control signal for that channel, which will then cause the output to be de-energized. In the latter, momentary control configuration, the user must select and hold the control input for the particular channel to energize the connected equipment during the period that he transmits the control signal. When the user wishes to de-energize the controlled equipment, he need only release the transmitter. The absence of the transmitted control signal will result in the output being de-energized.

Figure 5:
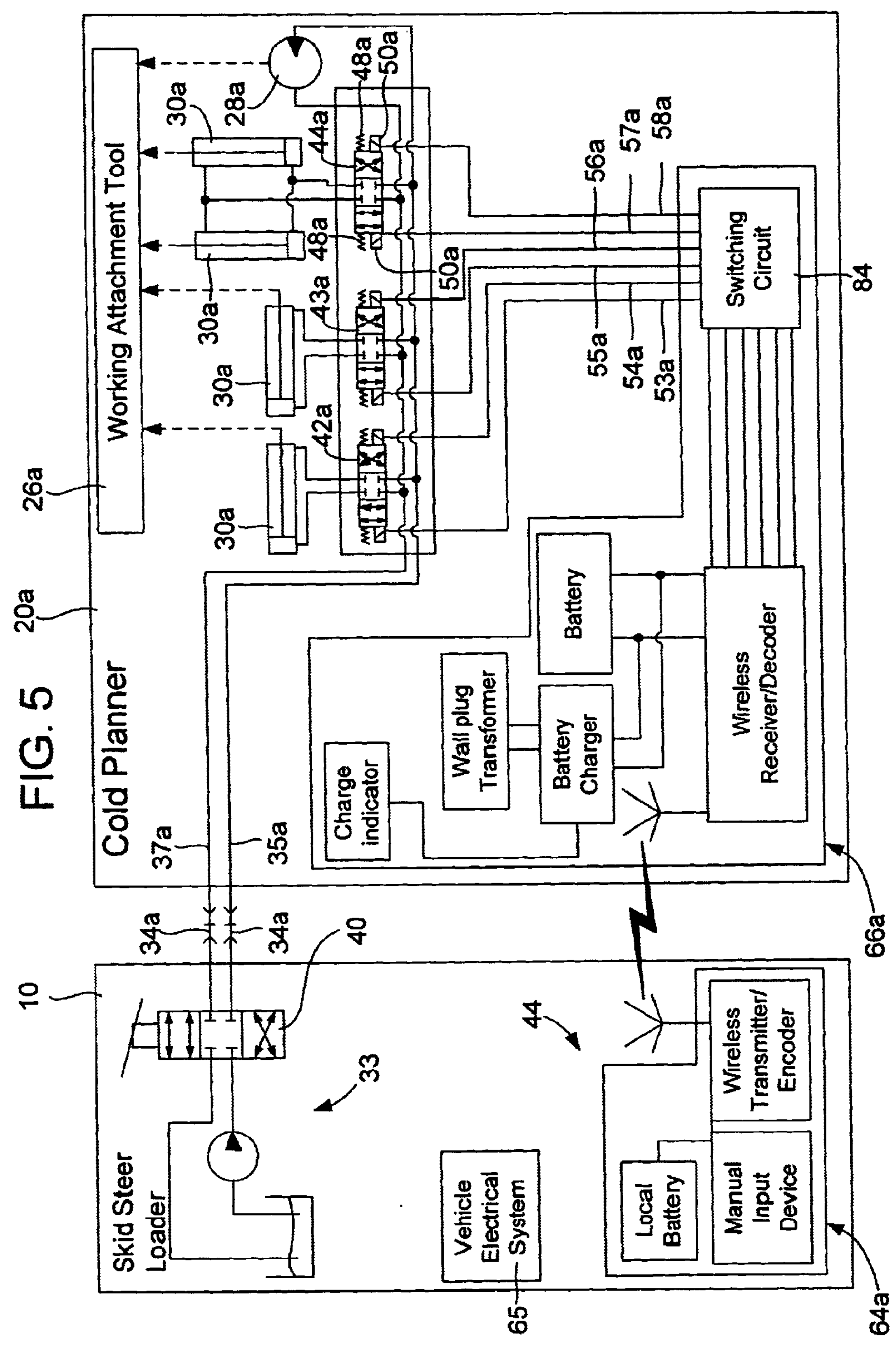
FIG. 5 is a schematic view of work apparatus comprising a cold planer attachment and a skid steer loader vehicle according to a second embodiment of the present invention.

Turning to FIG. 5, a second embodiment and application of the present invention is illustrated. It is similar in many respects to that illustrated in FIG. 1 and as such, only certain differences will be discussed for brevity. This embodiment is shown in the form of a cold planner work attachment 20*a* for the skid steer loader 10 and illustrates further aspects and versatility of the present invention. In this embodiment, the cold planner work attachment 20*a* includes multiple solenoid valves 42*a*–44*a*, with two channels or electrical lines 53*a*–58*a* provided for each solenoid valve, respectively. The transmitter module 64*a* and receiver module 66*a* are provided with at least six channels to support this application. Each solenoid valve 42*a*–44*a* is illustrated as a three position, four way valve with blocked over center position. Each solenoid valve 42*a*–44*a* has two solenoids 50*a* and two centering springs 48*a* to provide for the three illustrated positions of the valve. Each solenoid valve 42*a*–44*a* operates at least one hydraulic cylinder 30*a* for positioning the cold planner work tool 26*a,* with one of the solenoid valves 44*a* shown for operating two hydraulic cylinders 30*a*.

Like the first embodiment, flow in the hydraulic hoses 35*a,* 37*a* need not be reversed but can be maintained to keep the system simple and responsive for the vehicle operator. Specifically, once the control valve 40 in the skid steer loader 10 is activated to provide hydraulic power to the attachment 20*a,* there is no need to move the control valve 40 to retract or move the cylinders in opposite directions. This can all be accomplished through the two channels for each of the solenoid valves 42*a*–44*a,* in which activation of one of the channels of a given solenoid valve drives the corresponding hydraulic cylinder(s) in one direction and activation of the other channel of the given solenoid valve drives the corresponding hydraulic cylinder(s) in a reverse direction. To accomplish the embodiment of FIG. 5, more channels or electrical lines 53*a*–58*a* (and therefore switching circuits for the channels) are provided. If desired, a solenoid valve and one or more channels may also be provided for the hydraulic motor 28*a* of the cold planner work attachment 20*a*.

Although the first two embodiments have describe the invention in context of solenoid valves utilizing two solenoids and therefore two channels, as noted above, it will be appreciated that the invention is applicable to applications having valves activated by only one solenoid and therefore valves in an application may utilize only a single channel, such as conventional on/off valves. Each on/off valve may be connected to a different hydraulic actuator. The on/off valve may turn on or shut off flow leading to a hydraulic motor for example. In the case of a hydraulic actuator, reversal of flow using the skid steer control valve 40 changes the direction of the hydraulic cylinder.

Figure 6:
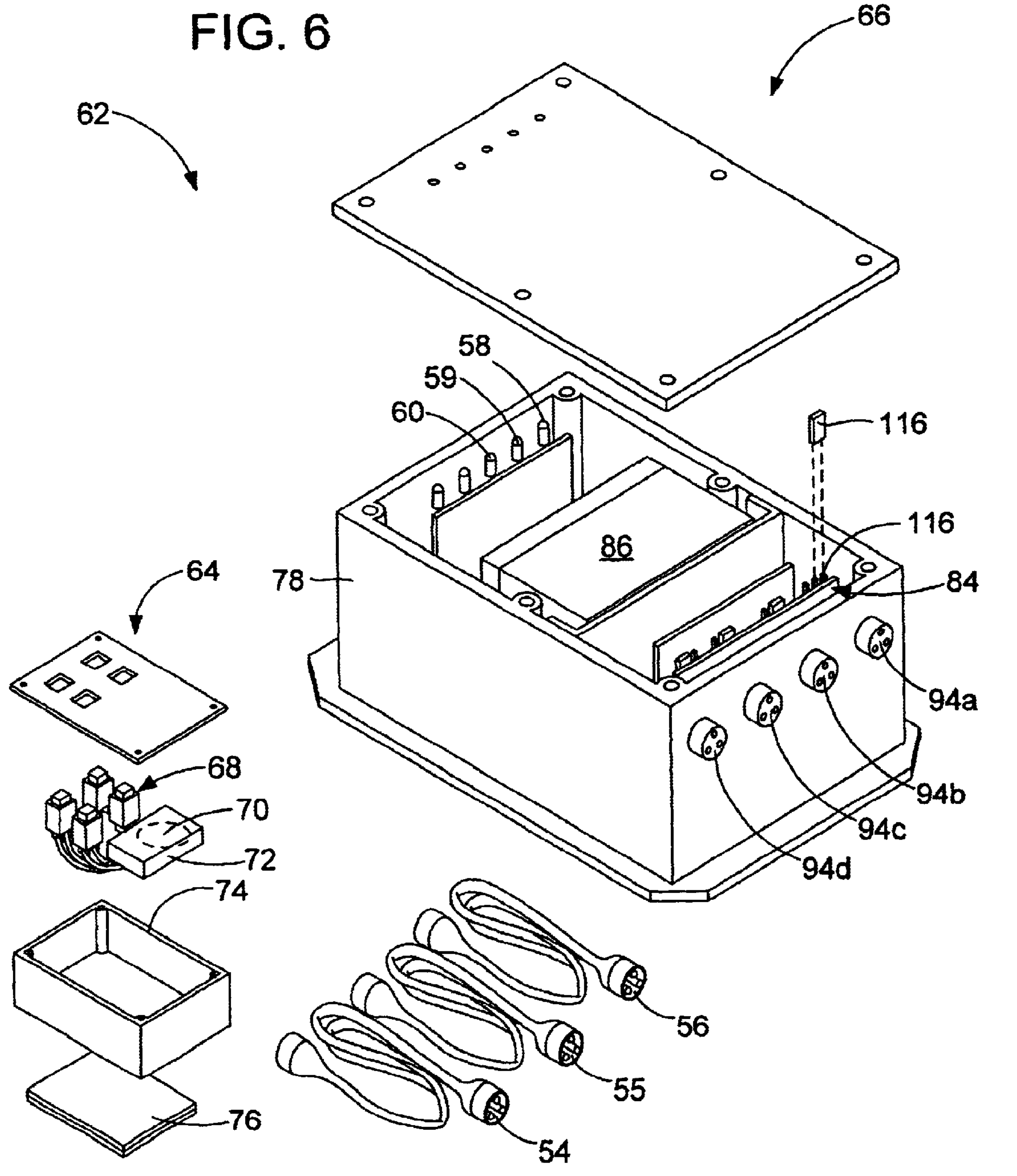
FIG. 6 is a perspective illustration of one embodiment of a wireless remote control kit for use on a loader vehicle and work attachment.

FIG. 6 illustrates an embodiment of the wireless remote control kit 62 as used in the embodiment shown for FIGS. 1–4. As will readily be appreciated, the existing wires on work attachments may be removed and replaced by installing this kit 62. The kit 62 may also be installed as an option on new work attachments. The kit 62 includes a transmitter module 64 preferably contained within a single housing 74 (along with a local power supply), and a receiver module 66 preferably contained within a single housing 78 along with the switching circuit 84, local power supply, charger, ect. The kit 62 is easily installed by mounting the receiver module 66 on the work attachment. The transmitter module 64 is sold along with the work attachment and then can be manually attached (and detached) or carried by the vehicle operator who purchases or rents the work attachment having the wireless remote control kit 62. The transmitter module 64 includes a mounting structure 76 (e.g. a clamp, removable fasteners, hooks, Velcro straps, tape, magnets, ect.) for selective attachment (preferably temporary attachment) and detachment to the skid steer loader. As shown in FIG. 6, the transmitter module 64 may include multiple input buttons as the operator input device 68, one for activating or energizing each different channel.

Figure 7:
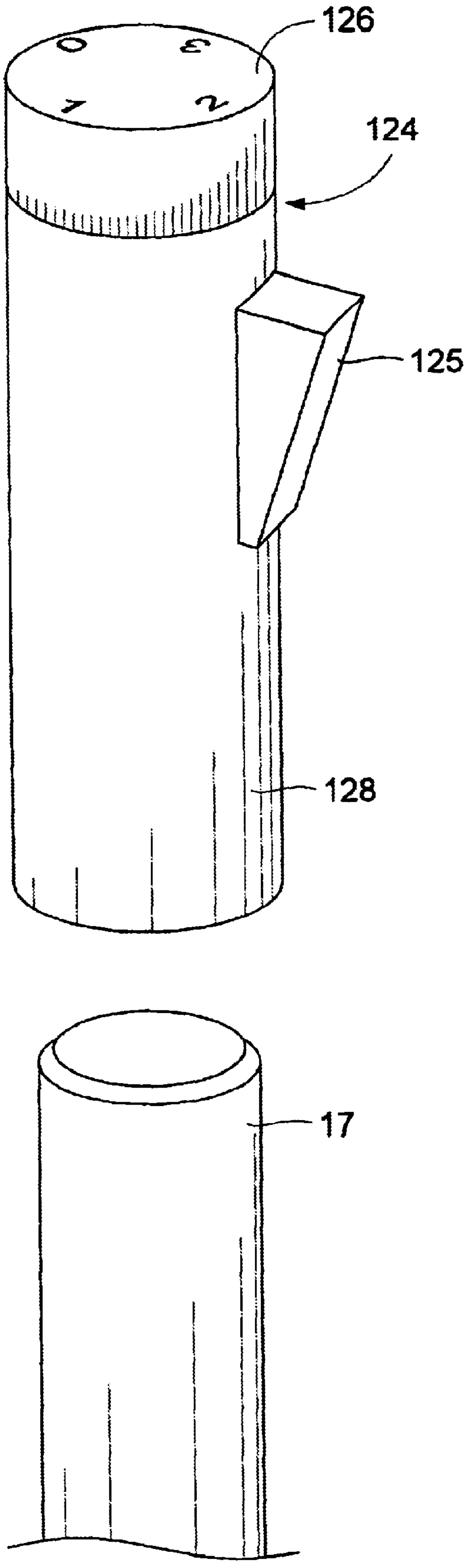
FIG. 7 is a perspective illustration of another embodiment of the transmitter of a wireless remote control kit for use on a loader vehicle and work attachment.

Alternatively, and according to an alternative embodiment shown in FIG. 7, a transmitter module 124 may include an activation trigger 125 and a selector dial or switch 126. According to this embodiment, the selector switch 126 can be rotated or moved between multiple discrete positions corresponding to the different channels, respectively. Thus, by moving the dial or selector switch 126, the channel and therefore the hydraulic actuator(s) being controlled is switched. Activation of the trigger 125 energizes the channel designated by the dial or switch 126. In this embodiment, the transmitter module has been configured as a handgrip with a sleeve housing 128 that slides upon or is otherwise mountable upon one of the control levers 17 in the cab of the skid steer loader 10. The selector switch and trigger may also be provided in separate housings (with each housing be mountable to different convenient locations in the skid steer cab) with a wire running therebetween.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best made known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A kit for establishing wireless communication between a loader vehicle and a work attachment, the loader vehicle having a pair of lift arms adapted to be selectively attached and detached from different work attachments, the loader vehicle having a hydraulic power system providing a hydraulic power source, the work attachment having a tool adapted to perform the work operation, the work attachment being removably attached to the lift arms through a quick attach mechanism, the work attachment being hydraulically connected to the hydraulic power source through a quick attach hydraulic coupling, the work attachment including at least one hydraulic actuator acting upon the tool and at least one solenoid valve, the at least one solenoid valve controlling hydraulic flow from the hydraulic power source to the at least one hydraulic actuator, the kit comprising:

an operator input device and a transmitter, the operator input device and the transmitter being independently powered without electrical communication with the loader vehicle, the operator input device receiving manual input, the transmitter generating wireless transmissions based on the manual input; and a wireless receiver mounted to the work attachment in electrical communication with the at least one solenoid valve, the wireless receiver receiving the wireless transmissions and communicating wireless transmissions with the at least one solenoid valve to operate the at least one hydraulic actuator.

2. The kit of claim 1 wherein the operator input device and the transmitter are contained in a transmitter module.

3. The kit of claim 2 wherein the transmitter module comprises a mounting and release mechanism adapted to selectively attach and detach the transmitter module to the loader vehicle.

4. The kit of claim 2 wherein the loader vehicle includes an operator lever adapted to actuate the loader vehicle, wherein the input device comprises a handgrip removably mounted to the operator lever.

5. The kit of claim 4 wherein the handgrip comprises a dial and a trigger for manual input, the dial switching the transmitter module among a plurality of channels, the trigger generating a control signal in the channel designated by the dial, each different channel adapted to control a different parameter on the work attachment.

6. The kit of claim 2 wherein the operator input device comprises a plurality of input buttons, the input buttons generating a plurality of wireless transmissions in a plurality of channels, respectively.

7. The kit of claim 6 wherein the transmitter module is removably mounted in an operator cab of the loader vehicle.

8. The kit of claim 2, wherein the transmitter module contains a battery providing an independent power source for the transmitter and the operator input device.

9. The kit of claim 1, wherein the wireless receiver is manually configurable to provide the wireless transmissions to the solenoid valve in one of a momentary and a latched state.

10. The kit of claim 1, wherein the wireless receiver is manually configurable to provide the wireless transmissions to the solenoid valve in one of a normally energized and a normally de-energized state.

11. The kit of claim 10, wherein the wireless receiver is manually configurable to provide the wireless transmissions to the solenoid valve in one of a momentary and a latched state.

12. The kit of claim 1, wherein the wireless receiver comprises a separate channel for each of the at least one solenoid valves, each channel comprising:

a channel connector coupling the solenoid valve to the wireless receiver, the channel connector having a first and a second electrical terminal; and an electronically controllable output control switch having an input coupled to a local power supply, and a first and a second output coupled to the first and the second electrical terminals, respectively, to provide a normally energized and a normally de-energized output to the solenoid valve on each of the first and the second electrical terminals.

13. The kit of claim 12, wherein each channel further comprises:

an electronic control switch controllably coupled to the output control switch, the electronic control switch having a control input;

a latching logic circuit having an input coupled to receive the wireless transmissions and a latching output; and wherein the control input of the electronic control switch is coupled to receive one of the latching output and the wireless transmissions.

14. The kit of claim 13, wherein the control input of the electronic control switch is coupled to an output pin of a jumper terminal block, wherein the latching output of the latching logic circuit is coupled to a first input pin of the jumper terminal block, wherein the wireless transmissions are coupled to a second input pin of the jumper terminal block, and wherein a jumper is manually positioned to couple one of the first and the second input pins to the output pin of the jumper terminal block.

15. The kit of claim 1 wherein the wireless receiver is powered by a local battery located at the work attachment.

16. The kit of claim 15 further comprising a local battery charger electrically connected to the battery adapted to receive external electrical power to recharge the local battery.

17. A work apparatus for performing a work operation, comprising in combination:

a loader vehicle comprising:

(a) at least one lift arm adapted to be selectively attached and detached from different work attachments;

(b) a hydraulic power system providing a hydraulic power source;

(c) an electrical system;

(d) an operator input device adapted to receive manual input;

(e) a transmitter generating wireless transmissions based on the manual input; and (f) a battery independent of the electrical system and not electrically connected thereto, the battery independently powering the transmitter and the operator input device;

a work attachment removably attached to the lift arms through a quick attach mechanism and hydraulically connected to the hydraulic power source through a quick attach hydraulic coupling, the work attachment comprising:

(a) a tool adapted to perform the work operation;

(b) at least one hydraulic actuator acting upon the tool;

(c) at least one solenoid valve controlling hydraulic flow from the hydraulic power source to the at least one hydraulic actuator; and (d) a wireless receiver in electrical communication with the at least one solenoid valve, the wireless receiver receiving the wireless transmissions and communicating with the at least one solenoid valve to operate the at least one hydraulic actuator.

18. The work apparatus of claim 17 wherein the operator input device, the battery, and the transmitter are contained in a transmitter module.

19. The work apparatus of claim 18 wherein the transmitter module comprises a mounting and release mechanism adapted to selectively attach and detach the transmitter module to the loader vehicle.

20. The work apparatus of claim 18 wherein the loader vehicle includes an operator lever adapted to actuate the loader vehicle, wherein the input device comprises a handgrip removably mounted to the operator lever.

21. The work apparatus of claim 20 wherein the handgrip comprises a dial and a trigger for manual input, the dial switching the transmitter module among a plurality of channels, the trigger generating a control signal in the channel designated by the dial, each different channel adapted to control a different parameter on the work attachment.

22. The work apparatus of claim 18 wherein the operator input device comprises a plurality of input buttons, the input buttons generating a plurality of wireless transmissions in a plurality of channels, respectively.

23. The work apparatus of claim 22 wherein the transmitter module is removably mounted in an operator cab of the loader vehicle.

24. The work apparatus of claim 17, wherein the wireless receiver is manually configurable to provide the wireless transmissions to the solenoid valve in one of a momentary and a latched state.

25. The work apparatus of claim 17, wherein the wireless receiver is manually configurable to provide the wireless transmissions to the solenoid valve in one of a normally energized and a normally de-energized state.

26. The work apparatus of claim 25, wherein the wireless receiver is manually configurable to provide the wireless transmissions to the solenoid valve in one of a momentary and a latched state.

27. The work apparatus of claim 17, wherein the wireless receiver comprises a separate channel for each of the at least one solenoid valves, each channel comprising:

a channel connector coupling the solenoid valve to the wireless receiver, the channel connector having a first and a second electrical terminal; and an electronically controllable output control switch having an input coupled to a local power supply, and a first and a second output coupled to the first and the second electrical terminals, respectively, to provide a normally energized and a normally de-energized output to the solenoid valve on each of the first and the second electrical terminals.

28. The work apparatus of claim 27, wherein each channel further comprises:

an electronic control switch controllably coupled to the output control switch, the electronic control switch having a control input;

a latching logic circuit having an input coupled to receive the wireless transmissions and a latching output; and wherein the control input of the electronic control switch is coupled to receive one of the latching output and the wireless transmissions.

29. The work apparatus of claim 28, wherein the control input of the electronic control switch is coupled to an output pin of a jumper terminal block, wherein the latching output of the latching logic circuit is coupled to a first input pin of the jumper terminal block, wherein the wireless transmissions are coupled to a second input pin of the jumper terminal block, and wherein a jumper is manually positioned to couple one of the first and the second input pins to the output pin of the jumper terminal block.

30. The work apparatus of claim 17 wherein the wireless receiver is powered by a local battery located at the work attachment.

31. The work apparatus of claim 30 further comprising a local battery charger electrically connected to the battery adapted to receive external electrical power to recharge the local battery.

32. A work apparatus for performing a work operation, comprising in combination:

a loader vehicle comprising:

(a) at least one lift arm adapted to be selectively attached and detached from different work attachments;

(b) a hydraulic power system providing a hydraulic power source;

(c) an operator input device adapted to receive manual input; and (d) a transmitter generating wireless transmissions based on the manual input;

a work attachment removably attached to the lift arms through a quick attach mechanism and hydraulically connected to the hydraulic power source through a quick attach hydraulic coupling, the work attachment comprising:

(a) a tool adapted to perform the work operation;

(b) at least one hydraulic actuator acting upon the tool;

(c) at least one solenoid valve controlling hydraulic flow from the hydraulic power source to the at least one hydraulic actuator;

(d) a wireless receiver in electrical communication with the at least one solenoid valve, the wireless receiver receiving the wireless transmissions and communicating with the at least one solenoid valve to operate the at least one hydraulic actuator; and (e) wherein the wireless receiver is manually configurable to provide the wireless transmissions to the solenoid valve in one of a momentary and a latched state.

33. The work apparatus of claim 32 wherein the operator input device and the transmitter are contained in a transmitter module.

34. The work apparatus of claim 33 wherein the transmitter module comprises a mounting and release mechanism adapted to selectively attach and detach the transmitter module to the loader vehicle.

35. The work apparatus of claim 33 wherein the loader vehicle includes an operator lever adapted to actuate the loader vehicle, wherein the input device comprises a handgrip removably mounted to the operator lever.

36. The work apparatus of claim 35 wherein the handgrip comprises a dial and a trigger for manual input, the dial switching the transmitter module among a plurality of channels, the trigger generating a control signal in the channel designated by the dial, each different channel adapted to control a different parameter on the work attachment.

37. The work apparatus of claim 33 wherein the operator input device comprises a plurality of input buttons, the input buttons generating a plurality of wireless transmissions in a plurality of channels, respectively.

38. The work apparatus of claim 37 wherein the transmitter module is removably mounted in an operator cab of the loader vehicle.

39. The work apparatus of claim 33, wherein the transmitter module contains a battery providing an independent power source for the transmitter and the operator input device.

40. The work apparatus of claim 32, wherein the wireless receiver is manually configurable to provide the wireless transmissions to the solenoid valve in one of a normally energized and a normally de-energized state.

41. The work apparatus of claim 40, wherein the wireless receiver is manually configurable to provide the wireless transmissions to the solenoid valve in one of a momentary and a latched state.

42. The work apparatus of claim 32, wherein the wireless receiver comprises a separate channel for each of the at least one solenoid valves, each channel comprising:

a channel connector coupling the solenoid valve to the wireless receiver, the channel connector having a first and a second electrical terminal; and an electronically controllable output control switch having an input coupled to a local power supply, and a first and a second output coupled to the first and the second electrical terminals, respectively, to provide a normally energized and a normally de-energized output to the solenoid valve on each of the first and the second electrical terminals.

43. The work apparatus of claim 42, wherein each channel further comprises:

an electronic control switch controllably coupled to the output control switch, the electronic control switch having a control input;

a latching logic circuit having an input coupled to receive the wireless transmissions and a latching output; and wherein the control input of the electronic control switch is coupled to receive one of the latching output and the wireless transmissions.

44. The work apparatus of claim 43, wherein the control input of the electronic control switch is coupled to an output pin of a jumper terminal block, wherein the latching output of the latching logic circuit is coupled to a first input pin of the jumper terminal block, wherein the wireless transmissions are coupled to a second input pin of the jumper terminal block, and wherein a jumper is manually positioned to couple one of the first and the second input pins to the output pin of the jumper terminal block.

45. The work apparatus of claim 32 wherein the wireless receiver is powered by a local battery located at the work attachment.

46. The work apparatus of claim 45 further comprising a local battery charger electrically connected to the battery adapted to receive external electrical power to recharge the local battery.

47. A work apparatus for performing a work operation, comprising in combination:

a loader vehicle comprising:

(a) at least one lift arm adapted to be selectively attached and detached from different work attachments;

(b) a hydraulic power system providing a hydraulic power source;

(c) an operator input device adapted to receive manual input for a plurality of channels; and (d) a transmitter including an encoder, generating wireless transmissions based on the manual input, each wireless transmission being encoded in one of the plurality of channels;

a work attachment removably attached to the lift arms through a quick attach mechanism and hydraulically connected to the hydraulic power source through a quick attach hydraulic coupling, the work attachment comprising:

(a) a tool adapted to perform the work operation;

(b) a plurality of hydraulic actuators acting upon the tool;

(c) a plurality of solenoid valves controlling hydraulic flow from the hydraulic power source to the hydraulic actuators;

(d) a wireless receiver including a decoder, the wireless receiver receiving and decoding wireless transmissions and generating electrical output signals in one of the plurality of channels, each electrical output signal corresponding directly to the manual input received at the operator input device; and (e) a plurality of separate dedicated electrical lines, at least one dedicated electrical line for each of the channels, respectively, each dedicated electrical line being directly coupled to electrical output signals of the respective channel for independently controlling different parameters on the work attachment such that parameters on the work attachment are directly responsive to the manual input, each solenoid valve being connected to at least one of the dedicated electrical lines to receive electrical output signals transmitted along a corresponding one of the channels.

48. The work apparatus of claim 47 wherein the operator input device and the transmitter are contained in a single transmitter module.

49. The work apparatus of claim 48 wherein the transmitter module comprises a mounting and release mechanism adapted to selectively attach and detach the transmitter module to the loader vehicle.

50. The work apparatus of claim 48 wherein the loader vehicle includes an operator lever adapted to actuate the loader vehicle, wherein the input device comprises a handgrip removably mounted to the operator lever.

51. The work apparatus of claim 50 wherein the handgrip comprises a dial and a trigger for manual input, the dial switching the transmitter module among the channels, the trigger generating a control signal in the channel designated by the dial, each different channel adapted to control a different parameter on the work attachment.

52. The work apparatus of claim 48 wherein the operator input device comprises a plurality of input buttons, the input buttons generating a plurality of wireless transmissions in the channels, respectively.

53. The work apparatus of claim 52 wherein the transmitter module is removably mounted in an operator cab of the loader vehicle.

54. The work apparatus of claim 48, wherein the transmitter module contains a battery providing an independent power source for the transmitter and the operator input device.

55. The work apparatus of claim 47, wherein the wireless receiver is manually configurable to provide the wireless transmissions to the solenoid valves in one of a momentary and a latched state.

56. The work apparatus of claim 47, wherein the wireless receiver is manually configurable to provide the wireless transmissions to the solenoid valves in one of a normally energized and a normally de-energized state.

57. The work apparatus of claim 56, wherein the wireless receiver is manually configurable to provide the wireless transmissions to the solenoid valves in one of a momentary and a latched state.

58. The work apparatus of claim 47, wherein the wireless receiver comprises a separate channel for each of the at least one solenoid valves, each channel comprising:

a channel connector coupling the solenoid valve to the wireless receiver, the channel connector having a first and a second electrical terminal; and an electronically controllable output control switch having an input coupled to a local power supply, and a first and a second output coupled to the first and the second electrical terminals, respectively, to provide a normally energized and a normally de-energized output to the solenoid valve on each of the first and the second electrical terminals.

59. The work apparatus of claim 58, wherein each channel further comprises:

an electronic control switch controllably coupled to the output control switch, the electronic control switch having a control input;

a latching logic circuit having an input coupled to receive the wireless transmissions and a latching output; and wherein the control input of the electronic control switch is coupled to receive one of the latching output and the wireless transmissions.

60. The work apparatus of claim 59, wherein the control input of the electronic control switch is coupled to an output pin of a jumper terminal block, wherein the latching output of the latching logic circuit is coupled to a first input pin of the jumper terminal block, wherein the wireless transmissions are coupled to a second input pin of the jumper terminal block, and wherein a jumper is manually positioned to couple one of the first and the second input pins to the output pin of the jumper terminal block.

61. The work apparatus of claim 47 wherein the wireless receiver is powered by a local battery located at the work attachment.

62. The work apparatus of claim 61 further comprising a local battery charger electrically connected to the battery adapted to receive external electrical power to recharge the local battery.

63. The work apparatus of claim 47 wherein at least one of the solenoid valves has multiple positions and at least two separate solenoids for driving the solenoids among respective positions, wherein at least two of the channels and dedicated electrical lines are coupled to the at least two separate solenoids, respectively.

64. On a work attachment having a tool adapted to perform a work operation, the work attachment being powered from a remote source of hydraulic power to perform the work operation, the work operation being controlled by at least one solenoid control valve, a wireless control mechanism, comprising:

a wireless transmitter having user operated controls thereon to control the work operation, the wireless transmitter transmitting control signals in response to user manipulation of the controls;

a wireless receiver mounted on the work attachment and adapted to receive the control signals from the wireless transmitter, the wireless receiver producing wired control signals corresponding to the control signals from the wireless transmitter;

a configurable power switching circuit selectively coupling an electrical power supply to the solenoid control valve, the configurable power switching circuit having a first configuration providing a normally energized output to the solenoid control valve, and a second configuration providing a normally de-energized output to the solenoid control valve; and a configurable control switching circuit coupled to receive the wired control signals from the wireless receiver, the control switching circuit controlling the coupling of the electrical power supply to the solenoid control valve.

65. The control mechanism of claim 64, wherein the control switching circuit is configurable into a momentary switching state whereby the control switching circuit transitions the power switching circuit only for so long as the wireless control signal is received, and wherein the control switching circuit is configurable into a latching switching state whereby the control switching circuit transitions the power switching circuit upon receipt of the wireless control signal.

66. The control mechanism of claim 65, wherein the control switching circuit comprises:

an electronic control switch controllably coupled to the power switching circuit, the electronic control switch having a control input;

a latching logic circuit having an input coupled to receive the wired control signals and a latching output; and wherein the control input of the electronic control switch is coupled to receive one of the latching output and the wired control signals.

67. The control mechanism of claim 66, wherein the control input of the electronic control switch is coupled to an output pin of a jumper terminal block, wherein the latching output of the latching logic circuit is coupled to a first input pin of the jumper terminal block, wherein the wired control signals from the receiver are coupled to a second input pin of the jumper terminal block, and wherein a jumper is manually positioned to couple one of the first and the second input pins to the output pin of the jumper terminal block.

68. The control mechanism of claim 66, wherein the power switching circuit comprises an electronically controlled power switch having a control coil coupled to the electronic control switch, the power switching circuit having an input coupled to the electrical power supply, a normally closed output and a normally opened output.

* * * * *